(12) United States Patent
Harish

(10) Patent No.: US 8,495,263 B2
(45) Date of Patent: Jul. 23, 2013

(54) UNIVERSAL INTERFACE COMPATIBILITY OF A SENSOR

(75) Inventor: Divyasimha Harish, Fremont, CA (US)

(73) Assignee: YPoint Capital, Inc., Fremont, CA (US)

( * ) Notice: Subject to any disclaimer, the term of this patent is extended or adjusted under 35 U.S.C. 154(b) by 427 days.

(21) Appl. No.: 12/234,745

(22) Filed: Sep. 22, 2008

(65) Prior Publication Data

US 2009/0083459 A1    Mar. 26, 2009

Related U.S. Application Data

(60) Provisional application No. 60/974,434, filed on Sep. 21, 2007.

(51) Int. Cl.
*G06F 3/00* (2006.01)
*G06F 5/00* (2006.01)

(52) U.S. Cl.
USPC .......................................................... 710/63

(58) Field of Classification Search
USPC .......................................................... 710/63
See application file for complete search history.

(56) References Cited

U.S. PATENT DOCUMENTS

| | | | |
|---|---|---|---|
| 7,256,505 B2 * | 8/2007 | Arms et al. | 290/1 R |
| 7,478,009 B2 * | 1/2009 | Cabrera et al. | 702/141 |
| 7,518,493 B2 * | 4/2009 | Bryzek et al. | 340/442 |

* cited by examiner

*Primary Examiner* — Chun-Kuan Lee
(74) *Attorney, Agent, or Firm* — Raj Abhyanker, P.C.

(57) ABSTRACT

A method and apparatus of a universal interface compatibility of a sensor are disclosed. In one embodiment, a universal interface method includes acquiring an electrical power of an external source and conditioning the electrical power to provide to a sensor. The universal interface method further includes transferring the processed electrical power to the sensor, receiving a sensor output, converting the sensor output to a compatible form, and communicating the compatible form to an interface. The external source may include at least one of a USB power source, a battery, and a wall charger. The electrical power may be conditioned by at least one of detecting an input voltage, adjusting a variance of the electrical power, and altering a voltage of the electrical power. The compatible form may include at least one of a digital signal and an analog signal.

20 Claims, 4 Drawing Sheets

UNIVERSAL INTERFACE COMPATIBILITY OF A SENSOR

CLAIM OF PRIORITY

This patent application claims priority from the Provisional Patent Application, Ser. No. 60/974,434, filed on Sep. 21, 2007

FIELD OF TECHNOLOGY

This disclosure relates generally to an enterprise method, a technical field of software and/or hardware technology and, in one example embodiment, to a universal interface compatibility of a sensor.

BACKGROUND

A sensor may use electrical power that is limited in voltage and/or current. The electrical power used by the sensor may not be available from a standard source. The sensor connector may further use a specific power connector and/or a wire that a consumer may use to create an electrical connection (e.g., a wire input, a solder connection, a wire wrap connection, etc.). The sensor may also use a quality of power (e.g., a clean power, a power at a precision level required for proper sensor readings) that exceeds a threshold standard of power provided by standard power sources. The power standard for the sensor and/or the sensor connector may prevent the sensor from operating with standard computers.

In addition, a sensor may use a custom sensor output and/or an analog voltage output with a voltage range that exceeds or falls below a threshold standard used for standard electronic equipment (e.g., a hard drive, a computer, a recording device. etc.). The sensor may further have a custom output connector and/or a connector that is used with specialized data collection equipment (e.g., an A/D converter, a data collection card, etc.). These additional requirements may also prevent the sensor from functioning with standard computers.

SUMMARY

A method and apparatus of a universal interface compatibility of a sensor (e.g., a strain gauge, a load cell, etc.) are disclosed. In one aspect, a universal interface method includes acquiring an electrical power of an external source and conditioning the electrical power to provide to a sensor. The universal interface method further includes transferring the processed electrical power to the sensor, receiving a sensor output, converting the sensor output to a compatible form, and communicating the compatible form to an interface.

The external source (e.g., a power source) may include at least one of a USB power source, a battery, and a wall charger. The electrical power (e.g., alternating current, direct current, etc.) may be conditioned by at least one of detecting an input voltage, adjusting a variance of the electrical power, and altering a voltage of the electrical power. The compatible form (e.g., a digital signal recognized by standard computer equipment, a wireless transmission to communicate with a computer, etc.) may include at least one of a digital signal and an analog signal (e.g., an analog signal varying between 0 and 5 volts). The compatible form may be communicated through at least one of a wired interface (e.g., a cable, a USB port, a conductor, etc.), a wireless interface (e.g., Zigbee, Bluetooth, WiFi, WiMax, etc.), and an analog interface (e.g., an A/D converter input, etc.).

The sensor output (e.g., a strain gauge output, a load cell output, etc.) may include at least one of an approximately 0 to 20 millivolt signal, an approximately 0 to 5 Volt signal, a 4-20 mA signal (e.g., a 4-20 milliamp signal), a frequency based output, and a digital signal. The wired interface may be coupleable using at least one of a USB standard, an I2C standard, and an SPI standard. The compatible form (e.g., a digital signal recognized by standard computer equipment, etc.) may be communicated through the wired interface using at least one of the approximately 0 to 20 millivolt signal, the approximately 0 to 5 Volt signal, the 4-20 mA signal, a frequency based output, and the digital signal. The method may further comprise transmitting the compatible form to a display.

In another aspect, a universal interface apparatus is comprised of a power conditioning module to acquire an electrical power of an external source and to condition the electrical power to provide to a sensor, a processing module to receive a sensor output and convert it to a compatible form, and an output module to communicate the compatible form to an interface.

The external source may include at least one of a USB power source, a battery, and a wall charger. The electrical power may be conditioned by at least one of detecting an input voltage, adjusting a variance of the electrical power, and altering a voltage of the electrical power. The compatible form may include at least one of a digital signal and an analog signal. The compatible form may be communicated through at least one of a wired interface, a wireless interface, and an analog interface. The sensor output may include at least one of an approximately 0 to 20 millivolt signal, an approximately 0 to 5 Volt signal, a 4-20 mA signal, a frequency based output, and a digital signal.

The output module may include at least one of a digital output module and an analog output module. The universal interface apparatus may further include a counter module to provide a count to the processing module when a frequency based output is received by the universal interface apparatus. The processing module may further include an A/D module to convert an analog sensor output to a digital form.

In yet another aspect, a method of manufacturing a universal interface compatibility of a sensor (e.g., a strain gauge, a load cell, etc.) includes forming a power conditioning module in a universal interface apparatus to acquire an electrical power of an external source and to condition the electrical power to provide to a sensor, placing a processing module in the universal interface apparatus to receive a sensor output and convert it to a compatible form, and creating an output module in the universal interface apparatus to communicate the compatible form to an interface. The external source may include at least one of a USB power source, a battery, and a wall charger.

The methods, systems, and apparatuses disclosed herein may be implemented in any means for achieving various aspects, and may be executed in a form of a machine-readable medium embodying a set of instructions that, when executed by a machine, cause the machine to perform any of the operations disclosed herein. Other features will be apparent from the accompanying drawings and from the detailed description that follows.

BRIEF DESCRIPTION OF THE DRAWINGS

Example embodiments are illustrated by way of example and not limitation in the figures of the accompanying drawings, in which like references indicate similar elements and in which.

Other features of the present embodiments will be apparent from the accompanying drawings and from the detailed description that follows.

DETAILED DESCRIPTION

A method, system, and apparatus of a universal interface compatibility of a sensor are disclosed. Although the present embodiments have been described with reference to specific example embodiments, it will be evident that various modifications and changes may be made to these embodiments without departing from the broader spirit and scope of the various embodiments.

Figure 1:
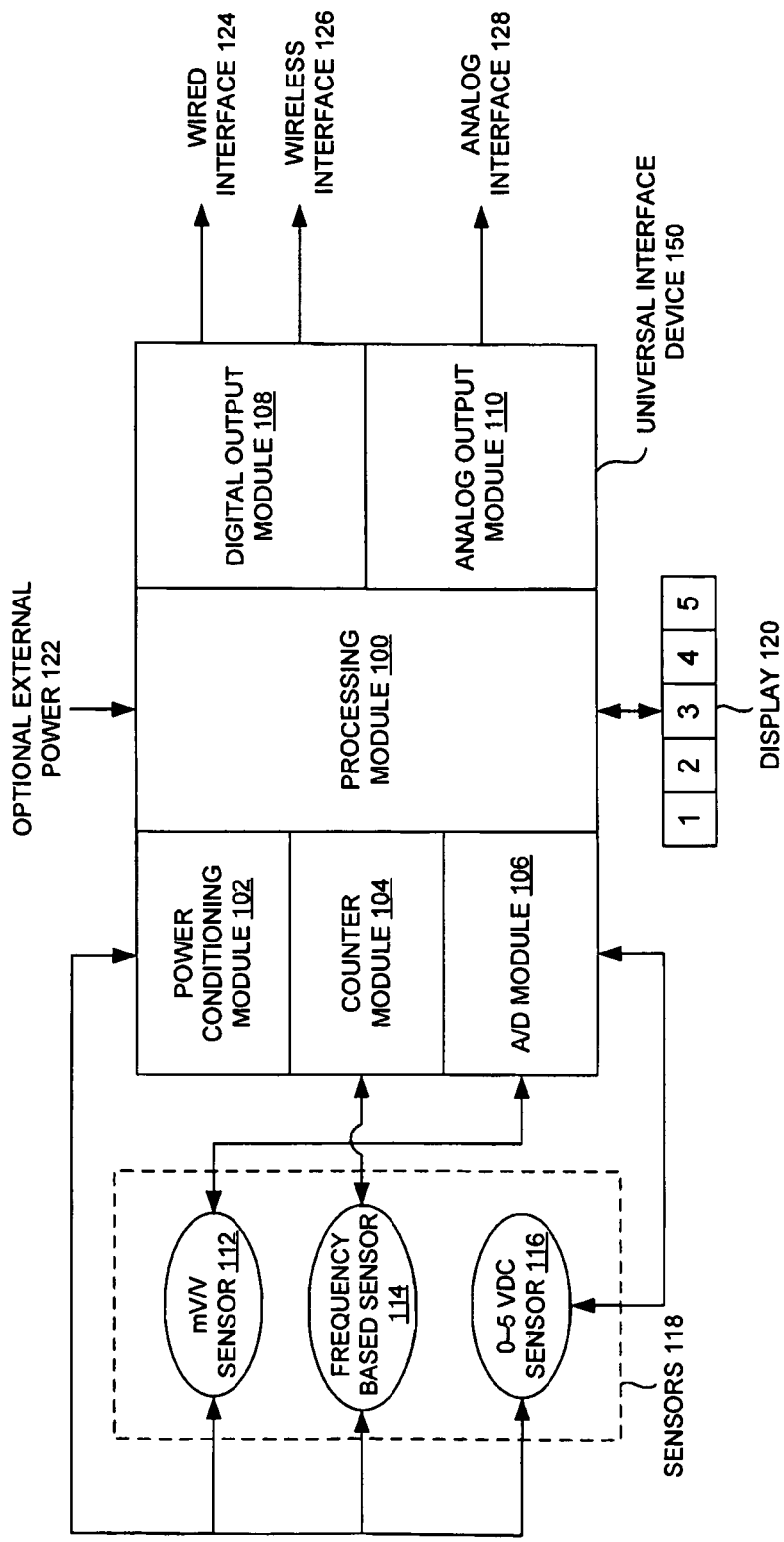
FIG. 1 is a system view of a universal interface that illustrates a processing module, a power conditioning module, and other various modules, according to one embodiment.

FIG. 1 illustrates one example embodiment of a system of a universal interface compatibility of a sensor. As shown, the universal interface device 150 may include a processing module 100, a power conditioning module 102, a counter module 104, an A/D module 106, a digital output module 108, and/or an analog output module 110. The universal interface device 150 may communicate and/or interact with sensors 118, a display 120, an optional external power 122, a wired interface 124, a wireless interface 126, and/or an analog interface 128.

The universal interface device (e.g., the universal interface device 150 and/or 350) may acquire an optional external power (e.g., the optional external power 122 and/or 322). The optional external power may be direct current and/or alternating current that may be provided by more than one source of electrical power. The optional external power may be provided by a battery, a wall charger, a USB power line, or any other source of electricity. The overall function of the universal interface device may be governed by the processing module 100, which may control and/or monitor the components of the universal interface device, the inputs, and/or the outputs of the device. The processing module 100 may also perform a number of other operations including the processing, computing, communication, linearization, calibration, storage, and/or display of various signals. These signals may be communicated between the processing module, components and/or modules of the universal interface device 150, sensors 118, interfaces (e.g., the wired interface, the wireless interface, the analog interface, etc.) and the display 120.

The universal interface device (e.g., the universal interface device 150 and/or 350) may communicate with sensors 118 (e.g., a strain gauge, a load cell, a temperature sensor, a wind sensor, etc.), which may be a single sensor or several sensors. As shown in FIG. 1, these sensors may include a mV/V sensor 112, a frequency based sensor 114, and/or a 0-5 VDC sensor 116, as well as any other type of sensor. The sensor output may be a 0 to 20 millivolt signal, an approximately 0 to 5 volt signal, a 4-20 mA signal, a frequency based output, and/or a digital signal.

The sensors 118 may communicate with the power conditioning module 102, and the sensors 118 may receive a conditioned power from the power conditioning module. The universal interface device 150 may provide power to any type of sensor.

Figure 2:
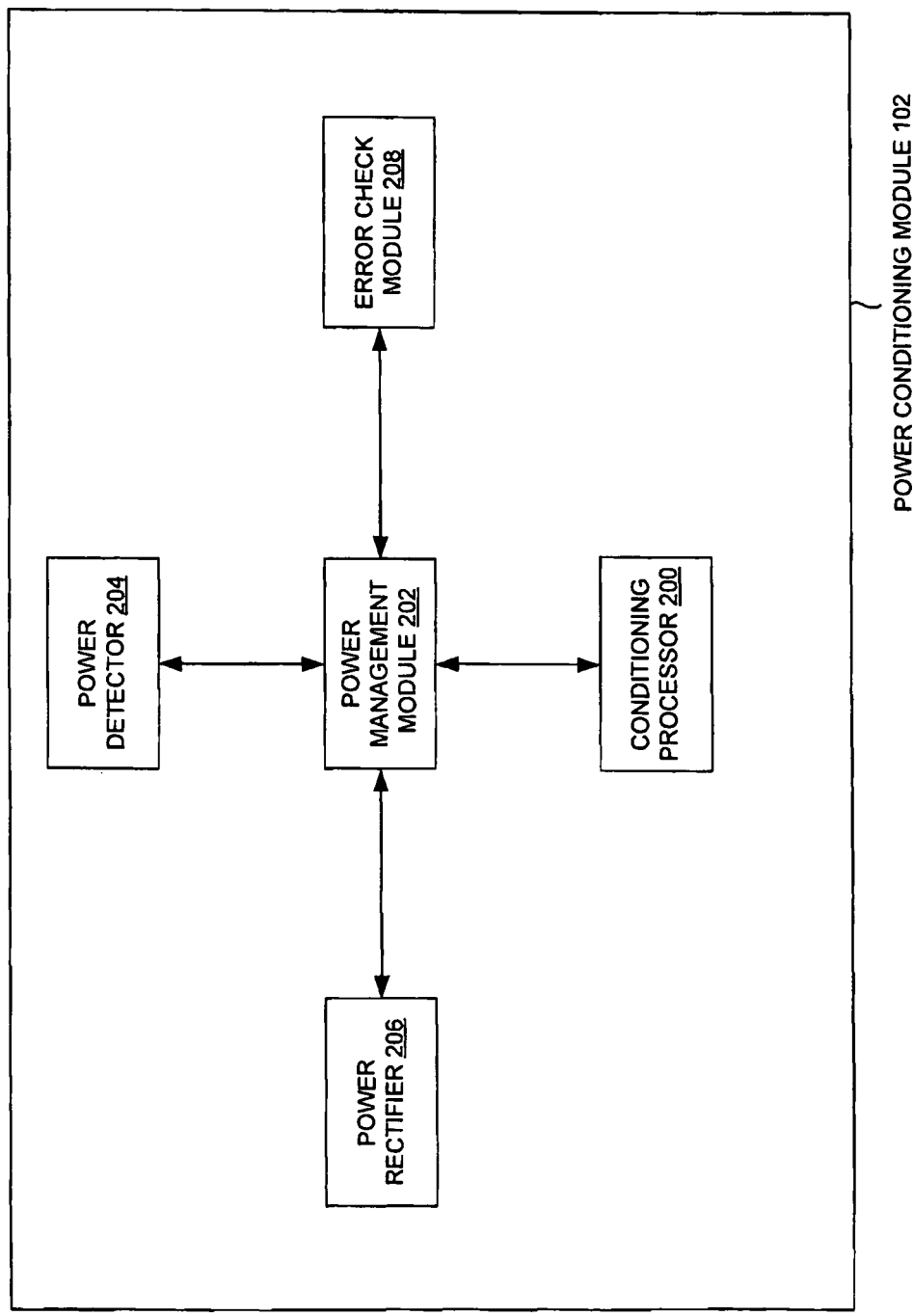
FIG. 2 is an exploded view of a power conditioning module that illustrates a power management module, a power rectifier, and other various modules communicating with each other, according to one embodiment.

FIG. 2 illustrates an embodiment of a power conditioning module 102 that includes a conditioning processor 200, a power management module 202, a power detector 204, a power rectifier 206, and an error check module 208. The electrical power may be conditioned by detecting an input voltage with the power detector 204 and/or by adjusting a variance of the electrical power with the power rectifier 206. A voltage of the electrical power may be altered by the power management module 202 and/or the power rectifier 206. The electrical power may further be conditioned by removing a power noise, sustaining power during a loss of power, and/or limiting a peak power. An error message may be generated by the error check module 208, which may account for problems in readings of a sensor (e.g., the sensors 118).

The communication between the sensors 118 and the power module 102 may relate to the type of power used by the sensor and/or a quality of power received by the sensor. The electrical power transferred to the sensors 118 may depend on the communication between the sensors 118 and the power conditioning module 102.

The sensors 118 may communicate with the counter module 104, and the communication may relate to a number of counts of a sensor output. The A/D module 106 may communicate with the sensors 118, and it may receive an analog signal (e.g., a 0-20 mV signal, a 0-5 volt signal, etc.) from the sensors 118 to be converted to a digital signal.

Each of the communications and/or power transfers between the sensors 118, the power conditioning module 102, the counter module 104, and/or the A/D module 106 may be governed and/or monitored by the processing module 100. The processing module 100 may convert the communications and/or power transfers to a compatible form (e.g., a digital signal, an analog signal, a wireless frequency, etc.). The processing module 100 may communicate the compatible form to an interface (e.g., a wired interface 124, a wireless interface 126, an analog interface 128).

The processing module 100 may communicate the compatible form (e.g., the digital signal, the analog signal) to an interface using a digital output module 108 and/or an analog output module 110. The digital output module 108 and/or the analog output module 110 may communicate with a wired interface 124, a wireless interface 126, and/or an analog interface 128.

The wired interface may be coupleable using at least one of a USB standard, an I2C standard, an SPI standard, and/or any other standard. The compatible form (e.g., the digital signal, the analog signal, etc.) may be communicated to the wired interface using at least one of the approximately 0 to 20 millivolt signal, the approximately 0 to 5 Volt signal, the 4-20 mA signal, a frequency based output, and the digital signal.

Figure 3:
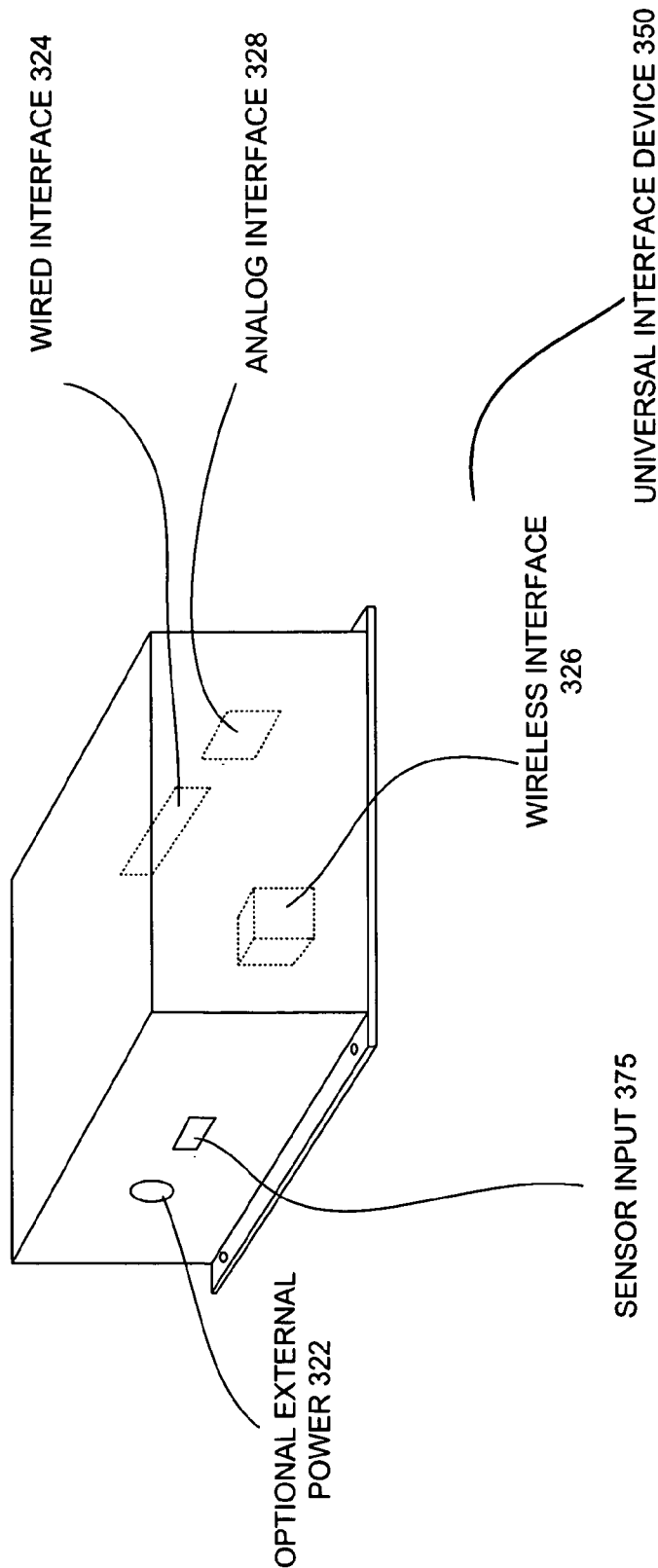
FIG. 3 is a magnified view of a universal interface apparatus, according to one embodiment.

FIG. 3 illustrates an embodiment of the universal interface compatibility of a sensor that includes a universal interface device 350, a sensor input 375, an optional external power 322, a wired interface 324, a wireless interface 326, and an analog interface 328. A sensor (e.g., a load cell, a strain gauge, a temperature sensor) may be coupled to the universal interface device using the sensor input 375, which may receive an analog input, a digital input, a frequency signal, and/or any other sensor input. The sensor input 375 may receive a 0-20 millivolt input, a 0-5 volt input, a 4-20 mA input, and a variety of other electrical sensor inputs varying in voltage and/or current. The universal interface device 350 may communicate a sensor output converted to a compatible form to one or more interfaces (e.g., the wired interface 324, the wireless interface 326, the analog interface 328, etc.)

Figure 4:
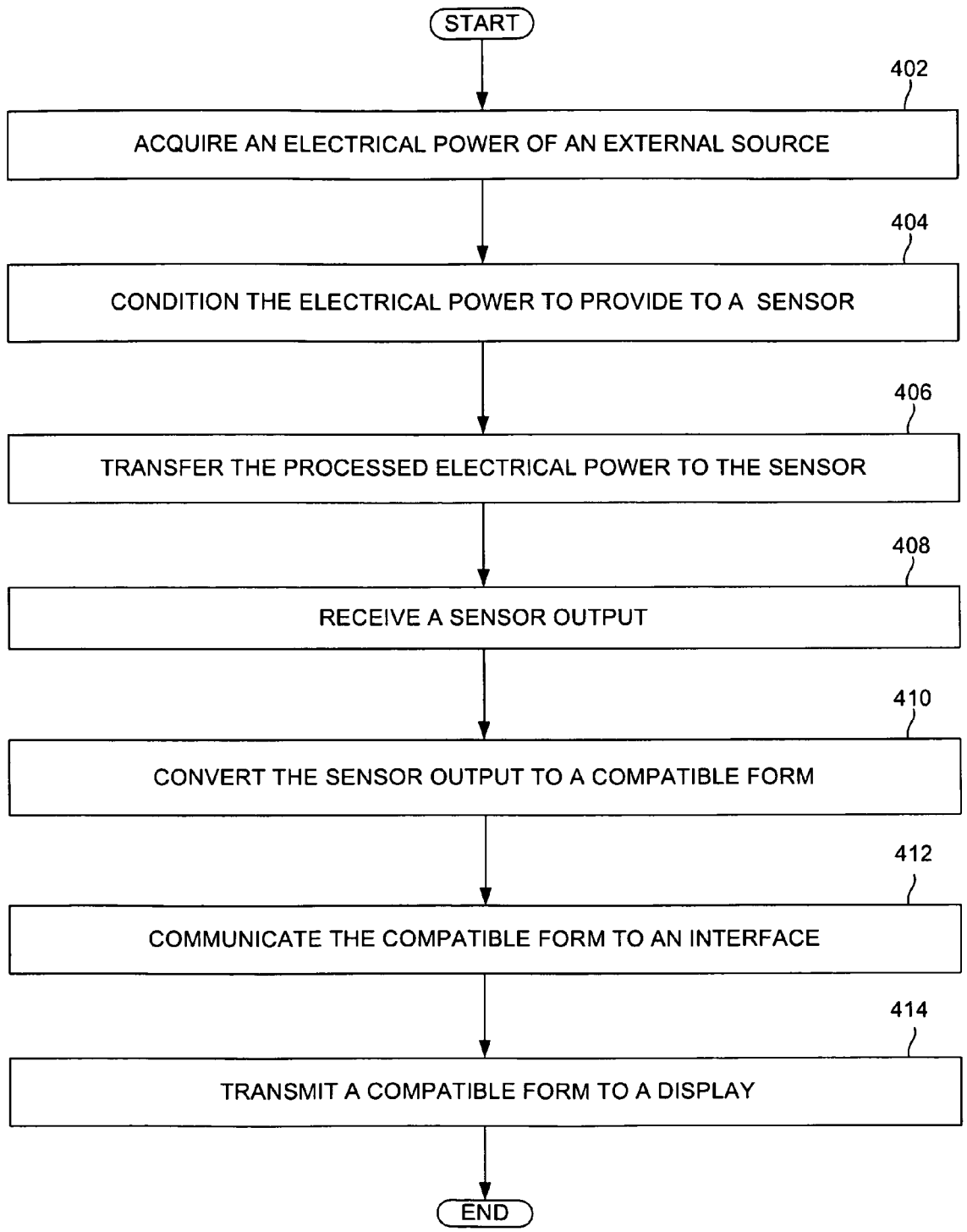
FIG. 4 is a process flow of transferring power to a sensor, receiving a sensor output, and converting the sensor output to a compatible form, according to one embodiment.

FIG. 4 is a graphical process flow of obtaining an optional external power, conditioning the electrical power, transferring the power to a sensor, obtaining a sensor output, and converting the sensor output to a compatible form, according to one embodiment. In operation 402, an electrical power of an external source may be acquired. The electrical power may be alternating current and/or direct current. The external source may be a battery, a USB power, a wall charger, and/or any other electrical power source.

In operation 404, the electrical power may be conditioned (e.g., filtered, rectified, smoothed, etc.) to be provided to a sensor (e.g., the strain gauge, the load cell, etc.). In operation 406, the processed electrical power may be transferred to the sensor. In operation 408, a sensor output (e.g., a millivolt signal, a 0-5 volt signal, a digital signal, a 4-20 mA signal, a frequency signal, etc.) may be received. In operation 410, the sensor output may be converted to a compatible form (e.g., a digital signal, a wireless transmission, etc.).

In operation 412, the compatible form may be communicated to an interface (e.g., the wired interface 124 and/or 324, the wireless interface 126 and/or 326, the analog interface 128 and/or 328, etc.). In operation 414, the compatible form may be transmitted to a display (e.g., the display 120).

In particular, the processing module 100, the power conditioning module 102, the counter module 104, the A/D module 106, the digital output module 108, the analog output module 110, the mV/V sensor 112, the frequency based sensor 114, the 0-5 VDC sensor 116, the sensors 118, the optional external power 122 and/or 322, the wired interface 124 and/or 324, the wireless interface 126 and/or 326, the analog interface 128 and/or 328, universal interface device 150 and/or 350, the conditioning processor 200, the power management module 202, the power detector 204, the power rectifier 206, the error check module 208, and/or the sensor input 375 of FIGS. 1-4 may be enabled using software and/or using transistors, logic gates, and electrical circuits (e.g., application specific integrated ASIC circuitry) such as a power circuit, an energy storage circuit, a motion circuit, a notification circuit, a signal processing circuit, a rectifier circuit, a power sensing circuit, a restrictor circuit, an external power circuit, and other circuits using one or more of the technologies described herein.

In addition, it will be appreciated that the various operations, processes, and methods disclosed herein may be embodied in a machine-readable medium and/or a machine accessible medium compatible with a data processing system (e.g., a computer system), and may be performed in any order (e.g., including using means for achieving the various operations). Accordingly, the specification and drawings are to be regarded in an illustrative rather than a restrictive sense.

What is claimed is:

1. A method, comprising:
    acquiring an electrical power signal of an external source at a universal interface device;
    communicating with a sensor coupled to the universal interface device through the universal interface device;
    conditioning, at the universal interface device, the electrical power signal, wherein the conditioning is based on a type of power used and a quality of power used by the sensor;
    transferring the conditioned electrical power signal to the sensor;
    receiving, at the universal interface device, a output of the sensor operating on the conditioned electrical power signal;
    converting the output of the sensor to an appropriate form thereof compatible with an interface associated with the universal interface device; and
    communicating the appropriate form to the interface.

2. The method of claim 1, further comprising generating an error signal through an error check module of the universal interface device to account for a problem in a reading of the sensor.

3. The method of claim 1, further comprising transmitting the appropriate form compatible with the interface to a display.

4. The method of claim 1, wherein the external source is at least one of a USB power source, a battery and a wall charger.

5. The method of claim 1, comprising conditioning the electrical power signal through at least one of detecting an input voltage, adjusting a variance of the electrical power signal, and altering a voltage of the electrical power signal.

6. The method of claim 1, wherein the appropriate form compatible with the interface is one of a digital signal and an analog signal.

7. The method of claim 1, wherein the interface is one of a wired interface, a wireless interface and an analog interface.

8. The method of claim 7, wherein the wired interface is associated with a Universal Serial Bus (USB) standard, an I2C standard, and a Serial Peripheral Interface (SPI) standard.

9. The method of claim 1, comprising performing at least one of the conditioning of the electrical power signal and the conversion of the output of the sensor to the appropriate form through a processor associated with the universal interface device.

10. A universal interface apparatus, comprising:
    a processing module to acquire an electrical power signal of an external source and to communicate with a sensor coupled to the universal interface apparatus; and
    a power conditioning module to condition the electrical power signal and to transfer the conditioned electrical power signal to the sensor,
    wherein the conditioning is based on a type of power used and a quality of power used by the sensor,
    wherein the processing module is further enables conversion of an output of the sensor operating on the conditioned electrical power signal to an appropriate form thereof compatible with an interface associated with the universal interface apparatus and communication of the appropriate form to the interface.

11. The universal interface apparatus of claim 10, further comprising a counter module to provide a count to the processing module when a frequency based output is received by the universal interface apparatus.

12. The universal interface apparatus of claim 11, wherein the processing module is further configured to transmit the appropriate form compatible with the interface to a display.

13. The universal interface apparatus of claim 10, wherein the external source is at least one of a USB power source, a battery and a wall charger.

14. The universal interface apparatus of claim 10, wherein the power conditioning module is configured to condition the electrical power signal through at least one of detecting an input voltage, adjusting a variance of the electrical power signal, and altering a voltage of the electrical power signal.

15. The universal interface apparatus of claim 10, wherein the appropriate form compatible with the interface is one of a digital signal and an analog signal.

16. The universal interface apparatus of claim 15, wherein the processing module is configured to perform the conversion of the output of the sensor to the appropriate form of the digital signal through an Analog-to-Digital (A/D) module.

17. The universal interface apparatus of claim 10, wherein the interface is one of a wired interface, a wireless interface and an analog interface.

18. The universal interface apparatus of claim 17, wherein the wired interface is associated with a USB standard, an I2C standard, and an SPI standard.

19. A system, comprising:
   a sensor; and
   a universal interface device coupled to the sensor, wherein the universal interface device further:
      acquires an electrical power signal of an external source,
      communicates with the sensor,
      conditions the electrical power signal, wherein the conditioning is based on a type of power used and a quality of power used by the sensor,
      transfers the conditioned electrical power signal to the sensor,
      receives an output of the sensor operating on the conditioned electrical power signal,
      converts the output of the sensor to an appropriate form thereof compatible with an interface associated with the universal interface device, and
      communicates the appropriate form to the interface.

20. The system of claim 19, wherein the external source is at least one of a USB power source, a battery and a wall charger.

* * * * *